J. J. RHINELANDER.
ROLLER CHAIN PIPE GRIP.
APPLICATION FILED AUG. 18, 1916.
1,217,503.
Patented Feb. 27, 1917.
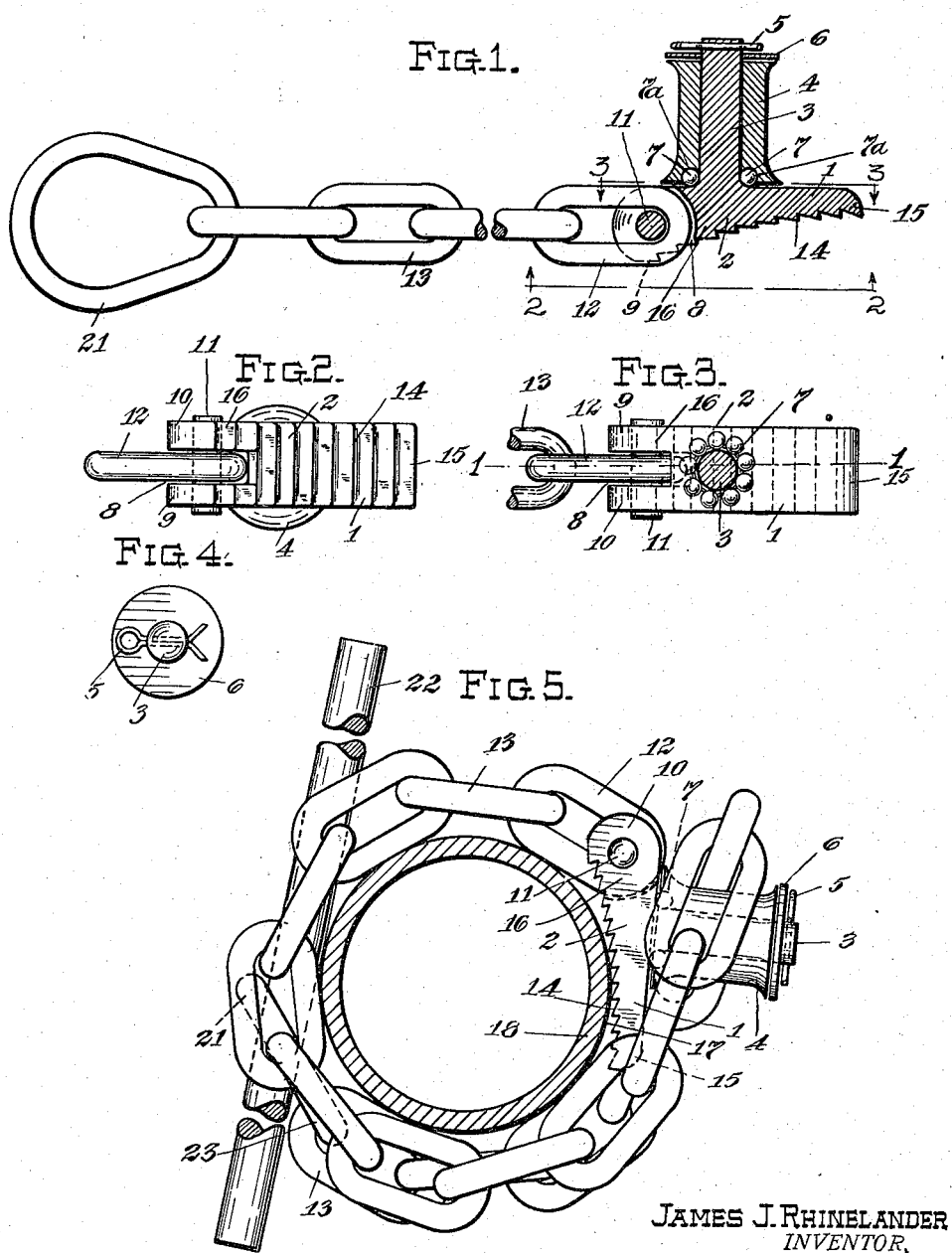
JAMES J. RHINELANDER
INVENTOR,
BY *William A. Hirtle*
ATTORNEY.

UNITED STATES PATENT OFFICE.

JAMES J. RHINELANDER, OF PITTSBURGH, PENNSYLVANIA.

ROLLER-CHAIN PIPE-GRIP.

1,217,503.  Specification of Letters Patent.  Patented Feb. 27, 1917.

Application filed August 18, 1916. Serial No. 115,627.

*To all whom it may concern:*

Be it known that I, JAMES J. RHINELANDER, a citizen of the United States of America, residing at Pittsburgh, in the county of Allegheny and State of Pennsylvania, have invented certain new and useful Improvements in Roller-Chain Pipe-Grips, of which the following is a specification.

The present invention relates to roller chain pipe grips and is adapted primarily to be used in connection with mill, mine and factory pipe lines where severe usage is necessary, and especially where it is impracticable to use a rope in combination with a gripping device, as in the case of hot steam pipes or the like.

My invention can be used in places where it is impossible to obtain long leverage, due to lack of space, and hence my "grip" is designed to withstand great strain in holding or revolving a pipe in situations of this character.

The capacity of my device is limited only by the length of the chain used, and is designed so that a single tool can be used on various sizes of pipe.

In the accompanying drawings forming part of this specification, I have shown one complete example of the physical embodiment of my invention, constructed according to the best mode I have so far devised for the practical application of the principles of the invention.

Figure 1 is a central longitudinal section of my invention, taken on line 1—1 of Fig. 3, showing the gripping jaw, and chain used in connection therewith.

Fig. 2 is a front view of the gripping jaw, as seen looking in the direction of the arrows of line 2—2 of Fig. 1.

Fig. 3 is a view partly in section of the gripping jaw taken on line 3—3 of Fig. 1.

Fig. 4 is an end view of the roller and wrist pin forming part of the device.

Fig. 5 is a cross-sectional view of a pipe showing my invention in operative position thereon.

In the drawings the numeral 1 indicates a gripping jaw, having a body portion 2, and a wrist pin 3 formed preferably integral therewith. The wrist pin 3 carries a roller 4, cotter pin 5 and washer 6. The device is also provided with ball bearings at 7, the groove 7ª carrying the balls for same being formed in the base of roller 4 as shown in Fig. 1.

The body portion 2 of the jaw 1 has a slot 8 adapted to receive the end link 12 of a chain 13, and the two extensions 9, 10 thus formed carry a pin 11 which in turn carries the aforesaid link 12 of the chain. The body portion 2 of the gripping jaw has on its inner face which is adjacent to the pipe as seen in Fig. 5 a curved toothed surface 14 to grip the surface 17 of pipe 18, and it is seen that the curve of said surface 14 does not necessarily conform to the rotundity of the pipe.

The one end 15 of the body portion 2 of the gripping jaw is of less thickness (as seen in Fig. 1) than the opposite end 16, for the purpose clearly illustrated in Fig. 5 of permitting the end 15 to "hug" the pipe 18 closely, thereby allowing the chain 13 to obtain a close contact with the outer surface 17 of the pipe, and insuring a good frictional hold by said chain on the pipe.

The roller 4 carried by the wrist pin 3 is shaped as shown in Fig. 1, the end diameters of the roller being greater than the diameter of the central portion thereof for the evident purpose of receiving the chain 13 conveniently. The ball bearings at 7 enable the roller 4 to rotate freely on the wrist pin 3, thus enabling the chain to advance around the roller as is readily understood.

The chain 13 has on its free extremity an enlarged link 21 adapted to receive the lever 22 (see Figs. 1 and 5).

The application of the device in turning or revolving a pipe 18 is shown in Fig. 5. The gripping jaw 1 is placed on the outer circumference 17 of the pipe, chain 13 is passed around the pipe and over the roller 4, and returned around the pipe to point 23. The lever 22 is then inserted in the link 21, and pressure exerted on the lever, thus revolving the pipe.

The advantage in the use of the ball bearings 7 is obvious, enabling the chain to pass around and advance freely over the wrist pin 3, the "slack" in the chain incident to adjusting the device around the pipe being "taken up" or adjusted instantly, by the tightening action of the lever 22, thus allowing the gripping effect of the teeth of the gripping jaw 1 to come into action against the surface of the pipe promptly, with the result of quick action of the device as a whole, which is an important feature in a device of the kind forming the subject of this invention.

It is noted that in the case of the ordinary pipe grip with rope attachment encircling the pipe, especially in the case of hot steam pipes where moisture is encountered, a great part of the power exerted is lost by the stretching of the rope, this style of grip being of comparatively little utility where great strain is required to rotate the pipe. In such situations a chain grip of the kind forming the subject of this invention is practically imperative, and it is seen that in my invention I have provided a serviceable grip adapted to withstand the most severe usage.

The small comparative size of the gripping jaw of my invention in proportion to the whole circumference of the pipe, and the packing compactness of the device as a whole is also noticeable, both of which features are very desirable in transporting tools from one location to another.

What I claim is:—

1. A gripping jaw comprising a jaw body having a curved toothed surface, one end of said jaw body having a greater thickness than the opposite end thereof, a wrist pin formed integral with the jaw body, a ball-bearing roller rotatably mounted on the wrist pin, means for securing the roller on the said wrist pin, a slot in the jaw body adapted to receive a link of a chain, and means for securing the said chain link to the end of the jaw body, said chain designed to encircle a pipe and be brought into coöperative relation with said roller.

2. A roller chain pipe grip comprising a gripping jaw having an arc-shaped jaw body with teeth thereon, a wrist pin on said jaw body, a ball-bearing roller mounted on the wrist pin, means for securing the said roller on the wrist pin, a chain attached to the gripping jaw, adapted to encircle a pipe, pass over the roller and return against the surface of the pipe, said chain adapted to receive a lever inserted in the free end thereof, the whole device being designed to permit instantaneous gripping action in rotating the aforesaid pipe about its axis.

In testimony whereof I affix my signature in the presence of two witnesses.

JAMES J. RHINELANDER.

Witnesses:
 JOHN F. SWEENY,
 RAYMOND J. GRAB.